(12) United States Patent
Li et al.

(10) Patent No.: US 9,436,874 B2
(45) Date of Patent: Sep. 6, 2016

(54) METHOD FOR DISCOVERING AUGMENTED REALITY OBJECT, AND TERMINAL

(71) Applicant: Huawei Device Co., Ltd., Shenzhen (CN)

(72) Inventors: Guoqing Li, Beijing (CN); Zhihao Jin, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/573,178

(22) Filed: Dec. 17, 2014

(65) Prior Publication Data

US 2015/0104069 A1 Apr. 16, 2015

Related U.S. Application Data

(63) Continuation of application No. PCT/CN2014/071169, filed on Jan. 23, 2014.

(30) Foreign Application Priority Data

Jan. 28, 2013 (CN) .......................... 2013 1 0031093

(51) Int. Cl.
| | | |
|---|---|---|
| G06K 9/00 | (2006.01) |
| H04N 5/225 | (2006.01) |
| G01C 21/36 | (2006.01) |
| H04W 4/04 | (2009.01) |

(52) U.S. Cl.
CPC ....... G06K 9/00671 (2013.01); G01C 21/3647 (2013.01); H04W 4/043 (2013.01)

(58) Field of Classification Search
None
See application file for complete search history.

(56) References Cited

U.S. PATENT DOCUMENTS

| | | |
|---|---|---|
| 7,617,042 B2 | 11/2009 | Horvitz et al. |
| 8,031,050 B2 | 10/2011 | Johnson |
| 2004/0027474 A1 | 2/2004 | Aoyama et al. |
| 2005/0222753 A1 | 10/2005 | Ishikawa |
| 2007/0185644 A1 | 8/2007 | Hirose |
| 2007/0233370 A1 | 10/2007 | Asada |
| 2010/0030466 A1* | 2/2010 | Rogers ............... G01C 21/3415 701/533 |

(Continued)

FOREIGN PATENT DOCUMENTS

| | | |
|---|---|---|
| CN | 101033978 A | 9/2007 |
| CN | 101451852 A | 6/2009 |

(Continued)

OTHER PUBLICATIONS

Foreign Communication From a Counterpart Application, European Application No. 14743259.5, Partial Supplementary European Search Report dated Jul. 31, 2015, 8 pages.

(Continued)

*Primary Examiner* — Randolph I Chu
(74) *Attorney, Agent, or Firm* — Conley Rose, P.C.; Grant Rodolph; Nicholas K. Beaulieu

(57) ABSTRACT

A method for discovering an augmented reality (AR) object is provided that is applicable to the field of AR technologies. The method for discovering an AR object includes, when it is determined, according to a pre-generated navigation route and a movement speed of a terminal, that a vicinity of a preselected AR object is reached, determining a status of the terminal; when it is determined that the terminal is in a searching state, starting a camera and acquiring a picture; and when the acquired picture includes the AR object, notifying of the AR object.

17 Claims, 7 Drawing Sheets

(56) References Cited

U.S. PATENT DOCUMENTS

| | | |
|---|---|---|
| 2011/0300876 A1 | 12/2011 | Lee et al. |
| 2013/0332066 A1 | 12/2013 | Jeung et al. |
| 2014/0016825 A1 | 1/2014 | Kasahara |
| 2015/0046080 A1* | 2/2015 | Wesselius ............. G08G 1/202 |
| | | 701/428 |

FOREIGN PATENT DOCUMENTS

| | | |
|---|---|---|
| CN | 102054166 A | 5/2011 |
| CN | 102123194 A | 7/2011 |
| CN | 102281348 A | 12/2011 |
| CN | 102519475 A | 6/2012 |
| CN | 102867169 A | 1/2013 |
| JP | 2002267484 A | 9/2002 |
| JP | 2003046610 A | 2/2003 |
| JP | 2004038871 A | 2/2004 |
| JP | 2004221869 A | 8/2004 |
| JP | 2005318519 A | 11/2005 |
| JP | 2007292713 A | 11/2007 |
| JP | 2009267792 A | 11/2009 |
| JP | 2012221250 A | 11/2012 |
| WO | 2008099482 A1 | 8/2008 |
| WO | 2012137463 A1 | 10/2012 |
| WO | 2012143300 A1 | 10/2012 |

OTHER PUBLICATIONS

Partial English Translation and Abstract of Chinese Patent Application No. CN101451852A, Jan. 23, 2015, 5 pages.
Foreign Communication From a Counterpart Application, PCT Application No. PCT/CN2014/071169, English Translation of International Search Report dated Apr. 3, 2014, 2 pages.
Foreign Communication From a Counterpart Application, PCT Application No. PCT/CN2014/071169, Written Opinion dated Apr. 3, 2014, 5 pages.
Foreign Communication From a Counterpart Application, Chinese Application No. 201310031093.X, Chinese Office Action dated Mar. 29, 2016, 9 pages.
Foreign Communication From A Counterpart Application, Japanese Application No. 2015-554037, Japanese Office Action dated Jul. 8, 2016, 4 pages.
Foreign Communication From A Counterpart Application, Japanese Application No. 2015-554037, Partial English Translation of Japanese Office Action dated Jul. 12, 2016, 5 pages.
Partial English Translation and Abstract of Japanese Patent Application No. JPA2002267484, Aug. 1, 2016, 33 pages.
Partial English Translation and Abstract of Japanese Patent Application No. JPA2003046610, Aug. 1, 2016, 22 pages.
Partial English Translation and Abstract of Japanese Patent Application No. JPA2004038871, Aug. 1, 2016, 66 pages.
Partial English Translation and Abstract of Japanese Patent Application No. JPA2004221869, Aug. 1, 2016, 39 pages.
Partial English Translation and Abstract of Japanese Patent Application No. JPA2005318519, Aug. 1, 2016, 48 pages.
Partial English Translation and Abstract of Japanese Patent Application No. JPA2007292713, Aug. 1, 2016, 52 pages.
Partial English Translation and Abstract of Japanese Patent Application No. JPA2009267792, Aug. 1, 2016, 140 pages.
Partial English Translation and Abstract of Japanese Patent Application No. JPA2012221250, Aug. 1, 2016, 47 pages.

* cited by examiner

METHOD FOR DISCOVERING AUGMENTED REALITY OBJECT, AND TERMINAL

CROSS-REFERENCE TO RELATED APPLICATIONS

This application is a continuation of international Application No. PCT/CN2014/071169, filed on Jan. 23, 2014, which claims priority to Chinese Patent Application No. 201310031093.X, filed on Jan. 28, 2013, both of which are hereby incorporated by reference in their entireties.

TECHNICAL FIELD

The present invention pertains to the field of augmented reality (AR) technologies, and in particular, to a method for discovering an AR object, and a terminal.

BACKGROUND

AR is a technology that is used to help people acquire, in a more intuitive and more vivid way, information related to a substance in the real world, and a technology that augments a user's perception of the real world by using information provided by a computer system. AR is generally implemented by using a mobile terminal or a head-mounted display system (HMD). Hardware of the foregoing device includes at least one camera and one display device, and may further include a positioning system and various sensors, such as the Global Positioning System (GPS), a gyroscope, and an optical sensor.

In an existing solution in which the foregoing device is used to accurately discover an AR object, if the AR object is a large object, for example, a landmark building, it is enough to use the GPS to lead a user to find the AR object; however, if the AR object is a small object, for example, several cell phone models at an indoor booth or several antiques in a museum, the existing solution cannot precisely lead the user to distinguish between an AR object and a non-AR object, and the user needs to manually photograph an ambient environment after reaching a vicinity of the AR object, so as to further identify the AR object.

SUMMARY

A purpose of embodiments of the present invention is to provide a method for discovering an AR object, and a terminal. The embodiments of the present invention are intended to resolve a problem in the prior art that only a large AR object can be positioned and a small AR object cannot be precisely identified.

According to a first aspect, a method for discovering an AR object is provided, including, when it is determined, according to a pre-generated navigation route and a movement speed of a terminal, that a vicinity of a preselected AR object is reached, determining a status of the terminal; when it is determined that the terminal is in a searching state, starting a camera and acquiring a picture; and when the acquired picture includes the AR object, notifying of the AR object.

In a first possible implementation manner of the first aspect, that it is determined, according to a pre-generated navigation route and a movement speed of the terminal, that a vicinity of a preselected AR object is reached includes acquiring a distance between a position of the AR object and a starting position of the terminal according to the pre-generated navigation route; acquiring, according to a movement manner preselected by the user, an average movement speed of the movement manner; calculating, according to the distance and the average movement speed, an expected time for the terminal to reach the vicinity of the AR object; and after the terminal starts from the starting position of the terminal, and has moved the expected time, determining that the vicinity of the AR object is reached.

With reference to the first aspect or the first possible implementation manner of the first aspect, in a second possible implementation manner, the method further includes, when the acquired picture does not include the AR object, collecting a current position parameter of the terminal by using a navigation and positioning system; and correcting the navigation route according to the position parameter.

With reference to the second possible implementation manner of the first aspect, in a third possible implementation manner, the position parameter includes at least one of positioning parameter information of a current position of the terminal and an obvious sign of the current position of the terminal.

With reference to the first aspect or any possible implementation manner of the first aspect, in a fourth possible implementation manner, further includes, when it is determined that the terminal moves irregularly in the vicinity of the AR object and finally goes far away from the AR object, outputting warning information.

With reference to the first aspect or any possible implementation manner of the first aspect, in a fifth possible implementation manner, the determining a status of the terminal includes determining, according to whether a gyroscope and a preset function are used, whether the terminal is in the searching state.

With reference to the fourth possible implementation manner of the first aspect, in a sixth possible implementation manner, the warning information includes at least one of the following: vibration, ringing, or light emitting.

According to a second aspect, a terminal is provided, including a status determining unit configured to, when it is determined, according to a pre-generated navigation route and a movement speed of the terminal, that a vicinity of a preselected AR object is reached, determine a status of the terminal; a picture acquiring unit configured to, when the status determining unit determines that the terminal is in a searching state, start a camera and acquire a picture; and a notifying unit configured to, when the picture acquired by the picture acquiring unit includes the AR object, notify of the AR object.

In a first possible implementation manner of the second aspect, the status determining unit includes a distance acquiring subunit configured to acquire a distance between a position of the AR object and a starting position of the terminal according to the pre-generated navigation route; a speed acquiring subunit configured to acquire, according to a movement manner preselected by the user, an average movement speed of the movement manner; an expected time acquiring subunit configured to calculate, according to the distance acquired by the distance acquiring subunit and the average movement speed acquired by the speed acquiring subunit, an expected time for the terminal to reach the vicinity of the AR object; and a determining subunit configured to, after the terminal starts from the starting position of the terminal, and has moved the expected time, determine that the vicinity of the AR object is reached.

With reference to the second aspect or the first possible implementation manner of the second aspect, in a second possible implementation manner, further includes a parameter collecting unit configured to collect, when the picture acquired by the picture acquiring unit does not include the AR object, a current position parameter of the terminal by using a navigation and positioning system; and a correcting unit configured to correct the navigation route according to the position parameter collected by the parameter collecting unit.

With reference to the second possible implementation manner of the second aspect, in a third possible implementation manner, the position parameter includes at least one of positioning parameter information of a current position of the terminal and an obvious sign of the current position of the terminal.

With reference to the second aspect or any possible implementation manner of the second aspect, in a fourth possible implementation manner, the terminal further includes a warning unit configured to, when it is determined that the terminal moves irregularly in the vicinity of the AR object and finally goes far away from the AR object, output warning information.

With reference to the second aspect or any possible implementation manner of the second aspect, the status determining unit is configured to, when it is determined, according to the pre-generated navigation route and the movement speed of the terminal, that the vicinity of the preselected AR object is reached, determine, according to whether a gyroscope and a preset function are used, whether the terminal is in the searching state.

With reference to the fourth possible implementation manner of the second aspect, in a fifth possible implementation manner, the warning information includes at least one of the following: vibration, ringing, or light emitting.

In the embodiments of the present invention, when it is determined that a terminal is in a searching state, a picture of an ambient environment is automatically acquired, thereby extracting one or more objects from the picture to match with an AR object, and implementing automatic startup of an AR processing procedure in an environment without a marking object, to accurately discover a small AR object, which greatly reduces time for discovering an AR object.

DETAILED DESCRIPTION

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

Figure 1:
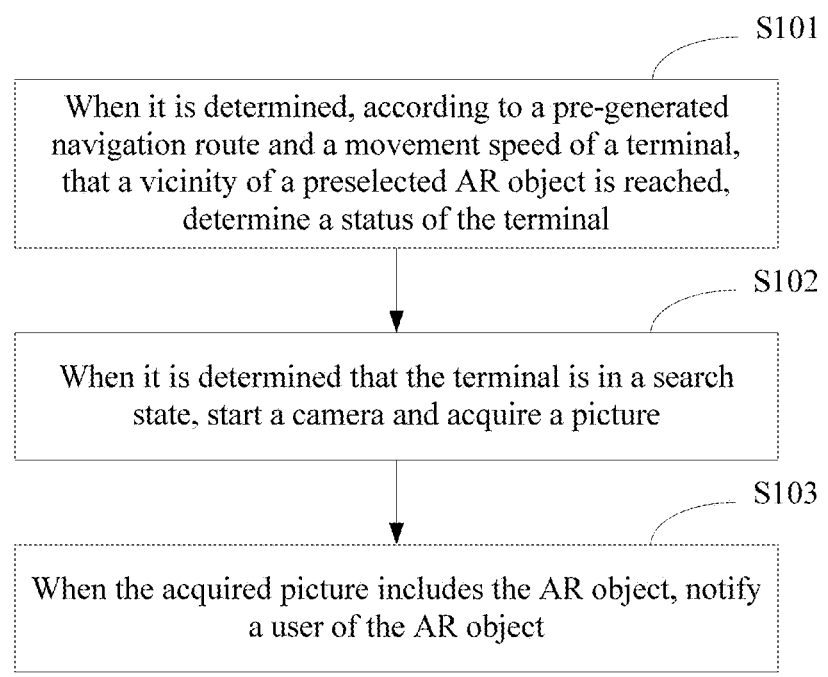
FIG. 1 is a flowchart of implementation of a method for discovering an AR object according to an embodiment of the present invention.

FIG. 1 is a flowchart of implementation of a method for discovering an AR object according to an embodiment of the present invention, which is described in detail in the following steps.

In step S101, when it is determined, according to a pre-generated navigation route and a movement speed of a terminal, that a vicinity of a preselected AR object is reached, determine a status of the terminal.

The determining a status of the terminal includes determining, according to whether a gyroscope and a preset function are used, whether the terminal is in a searching state.

In this embodiment, the terminal may acquire, by receiving an input instruction, the AR object preselected by a user, and determine a position of the AR object, thereby generating the navigation route by using a navigation and positioning system and, according to a current position (that is, a starting position) of the terminal and the position of the AR object, to lead the user to reach a vicinity of the AR object preselected by the user. The navigation and positioning system includes but is not limited to the GPS, a Global Navigation Satellite System (GLONASS), a Beidou system, and the like.

The terminal may acquire a position selected by the user on a map displayed on the terminal; search for, centering on the selected position, an AR object, and display, centered on a current position of the user, the AR object obtained through search on a radar map. The user may select one or more AR objects by using the radar map, thereby generating a navigation route and leading the user to reach a vicinity of the preselected one or more AR objects.

The navigation route may be generated according to a movement manner preselected by the user. The user preselects a transportation manner of getting to a destination, for example, walking, bicycling, or driving; in this case, the current position of the terminal may be used as a departure position; and the navigation route is generated according to the departure position, the destination, and the movement manner preselected by the user, thereby leading the user to get to the vicinity area of the AR object selected by the user.

It should be noted that, due to a positioning precision problem of the navigation and positioning system, when the AR object is a small object, the navigation route generated by using a navigation and positioning function can only lead a user to reach a vicinity of the AR object, and it is not necessarily ensured that the user is led to reach a precise position of the AR object.

Preferably, after the terminal generates the navigation route, a component or a functional module, such as a camera, a gyroscope, an accelerator, an electronic compass, and the GPS, that is not required to be used during a movement process of the terminal may be temporarily disabled, and the component or the functional module that is temporarily disabled is enabled again after the terminal determines that the vicinity of the AR object is reached. The navigation and positioning system is not used for navigation during the movement process of the terminal; instead, a Global System for Mobile Communications (GSM)/Third Generation (3G) signal and a base station are used for low-precision navigation, so as to reduce power consumption of the terminal.

Figure 2:
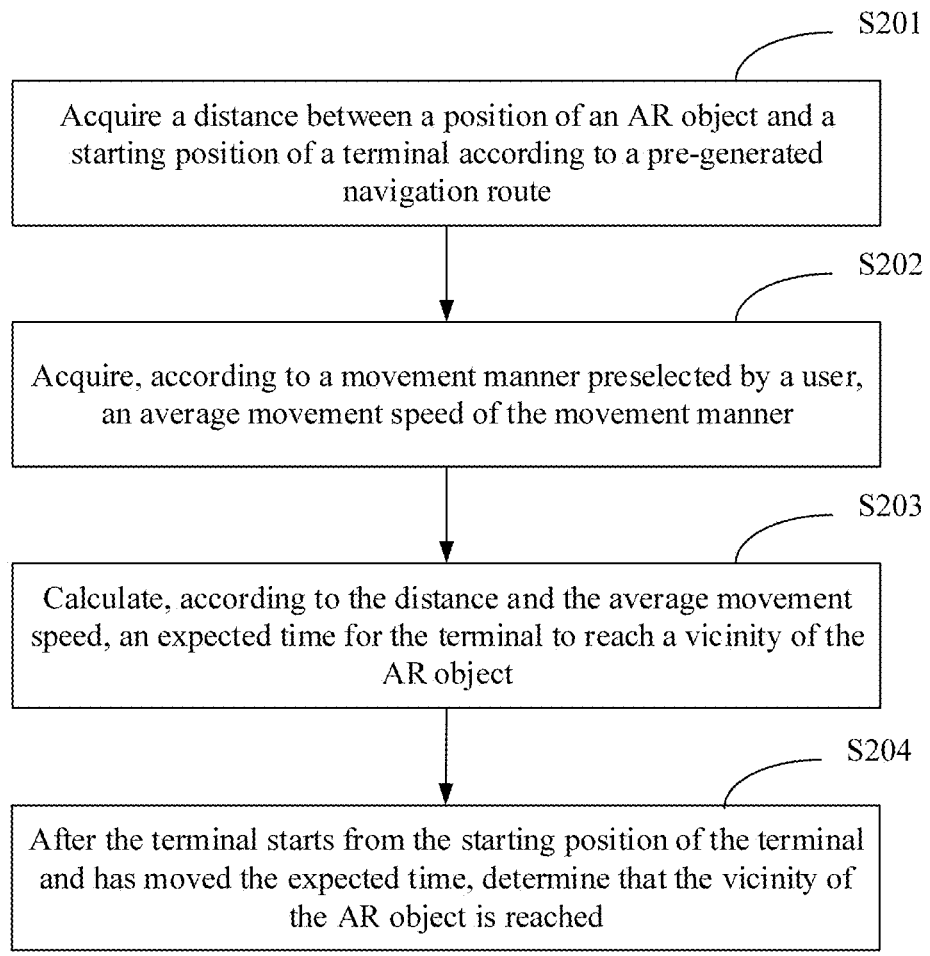
FIG. 2 is a flowchart of specific implementation of step S101 in the method for discovering an AR object according to the embodiment of the present invention.

In this embodiment, after generating the navigation route by using the navigation and positioning system, the terminal may determine, according to the generated navigation route and a movement speed of the terminal, whether the vicinity of the preselected AR object is reached. As shown in FIG. 2, step S101 includes the following steps.

Step S201: Acquire a distance between the position of the AR object and the starting position of the terminal according to the pre-generated navigation route.

The terminal acquires the distance between the position of the AR object and the starting position of the terminal according to the generated navigation route.

In step S202, acquire an average movement speed of the movement manner according to the movement manner preselected by a user.

For example, when the user chooses to walk, an average movement speed of walking, for example, 5 kilometers/hour (km/h), may be acquired according to a related configured parameter. The acquired average movement speed may be pre-configured in a system according to different movement manners, and may be an estimated value. Similarly, the terminal may pre-record a speed when the user walks, runs, bicycles, or moves in another manner, and estimate an average speed of the user in each movement manner according to statistics data.

In step S203, calculate, according to the distance and the average movement speed, an expected time for the terminal to reach the vicinity of the AR object.

In step S204, after the terminal starts from the starting position of the terminal, and has moved the expected time, determine that the vicinity of the AR object is reached.

In this embodiment, the terminal may set a task alarm according to the expected time obtained through estimation, so as to alert, in a form of a task alarm at a predicted moment when the terminal is close to the destination, the user that the AR object is nearby, thereby reminding the user to notice focusing on whether the AR object appears.

Preferably, the expected time may be corrected according to an actual movement situation of the terminal. For example, the user originally plans to carry the terminal and walk to the vicinity of the AR object, but changes the plan halfway during the navigation route and decides to accomplish the remaining route by driving. When the movement manner changes, the terminal receives, during the movement process, a movement manner alteration instruction that is input by the user, where a movement manner of "walking" is changed into a movement manner of "driving", and then the terminal may adjust the expected time according to an average movement speed of the movement manner changed by the user, and the remaining route.

In step S102, when it is determined that the terminal is in the searching state, start a camera and acquire a picture.

In this embodiment, after it is determined in step S101 that the terminal reaches the vicinity of the AR object, sensors such as the gyroscope and the optical sensor that were temporarily disabled may be enabled again to collect a status parameter of the terminal. It is determined whether the status parameter of the terminal meets a preset condition, so as to determine a current state of the terminal, thereby determining whether the terminal is in a normal movement state or in a searching state. When it is determined that the terminal is in the searching state, that is, it is determined that the user may be currently confirming an ambient environment by using the terminal, so as to look for the AR object in the ambient environment. Content related to determining whether the status parameter of the terminal meets a preset condition is described in detail in a subsequent embodiment of the present invention, and details are not described herein again.

After determining that it is in the searching state, the terminal automatically enables the camera to take a photo, or collect a video stream to extract an image frame. The foregoing action of taking a photo or acquiring a video stream may be implemented by using a terminal such as a smartphone or a head-mounted device. In addition, before a photo or an image frame in a video stream is acquired, the photo or the image frame may be optimized, for example, magnified, adjusted in brightness, or adjusted in contrast (the processing method includes but is not limited to the foregoing methods, and may be any method that improves a watch effect of visible content and makes the visible content more suitable for human eye watching). Afterward, N focused objects on which the user may focus are extracted from a picture by using an image recognition algorithm, so as to determine whether the N focused objects include the AR object, where N is an integer greater than or equal to 1.

When N (N is an integer greater than or equal to 1) focused objects may be extracted from a picture, a system may first use a high-speed and low-precision recognition algorithm to process M (where M is an integer greater than or equal to 1, and less than or equal to N) focused objects in the picture, and then identify remaining N–M focused objects by using a precise recognition algorithm, so as to determine whether the focused objects include the AR object. In this embodiment, the high-speed and low-precision recognition algorithm may identify a non-AR object as an AR object, but may not identify an AR object as a non-AR object, while the precise recognition algorithm can precisely identify an AR object and a non-AR object, which, however, takes a relatively long time. Therefore, by using the foregoing processing method, overall processing time is reduced on a premise that identification precision is ensured.

Preferably, when a head-mounted device is used as a device for discovering an AR object, because the head-mounted device can detect a change in an angle of view of the user, when discovers, after acquiring a picture, that the user quickly changes a current angle of view, that is, a time during which the user is in a focusing state is less than a threshold T, the current picture is no longer optimized, and is only saved; and if the time during which the user is in a focusing state is greater than the threshold T, it is determined that the user is interested in an object in a current field of view, that is, the acquired current picture probably includes the AR object, and a subsequent processing is performed on the picture.

In step S103, when the acquired picture includes the AR object, notify user of the AR object.

In this embodiment of the present invention, when it is determined that a terminal is in a searching state, a picture of an ambient environment is automatically acquired, thereby extracting one or more objects from the picture to match with an AR object, and implementing automatic startup of an AR processing procedure in an environment without a marking object, to accurately discover a small AR object, which greatly reduces time for discovering an AR object.

It should be noted that, an execution body of the foregoing steps S101 to S103 and steps S201 to S204 is a terminal.

The following describes in detail a specific embodiment of determining whether a status parameter of a terminal meets a preset condition according to this embodiment of the present invention.

In an embodiment of the present invention, a status parameter of a terminal may include an average movement speed of the terminal from a departure position to a vicinity of an AR object, and include a current movement speed of the terminal; in this case, a step of determining whether the terminal is in a searching state is determining whether a difference value by which the current movement speed of the terminal is lower than the average movement speed is greater than a preset threshold.

In this embodiment, it is determined, by monitoring a speed of the terminal and according to a change situation of the speed of the terminal, whether the terminal is in the searching state. The average movement speed of the terminal may be obtained through calculation according to a movement time and an accumulated actual movement distance before the terminal reaches the vicinity of AR object, or an average movement speed of a movement manner preselected by the user may be directly obtained; and it is determined, according to whether the difference value by which the current movement speed of the terminal is lower than the average movement speed is greater than the preset threshold, whether the movement speed of the terminal obviously decreases. If the movement speed of the terminal obviously decreases, it is considered that the terminal is in the searching state.

Further, preferably, the status parameter of the terminal includes a running status of a preset function of the terminal. Considering that the movement speed of the terminal obviously decreases probably because of temporarily answering a call or checking a short message service message, and so on, the step of determining whether the terminal is in a searching state is, when the difference value by which the current movement speed of the terminal is lower than the average movement speed is greater than the preset threshold, determining whether the preset function is in a disabled state.

In this embodiment, the preset function includes but is not limited to preset functions such as a voice call, a short message service message, a multimedia messaging service, an alarm, and a calendar event. If it is determined that one or more of the preset functions are being used, it is determined that the movement speed of the terminal does not decrease because that the user is focusing on a suspected AR object, and monitoring of the change of the movement speed of the terminal is resumed. If it is determined that all the preset functions are in a disabled state, it can be determined that the terminal is in the searching state.

Further, preferably, the status parameter of the terminal includes a movement status of the terminal; in this case, the step of determining whether the terminal is in a searching state is, when the difference value by which the current movement speed of the terminal is lower than the average movement speed is greater than the preset threshold, determining whether the movement status of the terminal is a steady state.

A sensor, such as a gyroscope, may be used to determine whether a smartphone or a head-mounted device is in a steady state. When the movement status of the terminal is a steady state, it is further determined that the user is focusing on an object.

Further, determining whether the movement status of the terminal is a steady state may be determining whether a time during which the movement status of the terminal is a steady state is greater than a preset time threshold.

In this embodiment, considering mutability of the movement status of the terminal, when data collected by the gyroscope indicates that the movement status of the terminal is a steady state, it may be further determined whether the time during which the movement status of the terminal is a steady state is greater than the preset time threshold. If it is less than the present time threshold, it is determined that the terminal is not in the searching state; and until the time during which the movement status of the terminal is a steady state is greater than the preset time threshold, it is then determined that the terminal is in the searching state.

Preferably, when the terminal further has a user pupil monitoring function, a change situation of a size of a pupil may be used to identify whether the user is staring at an object. For example, when the user is focusing on a substance, a pupil of an eye dilates. In this way, a front-facing camera of the terminal may be used to photograph a size of a pupil of a user for auxiliary reference, thereby further improving accuracy in determining the status of the terminal.

Figure 3:
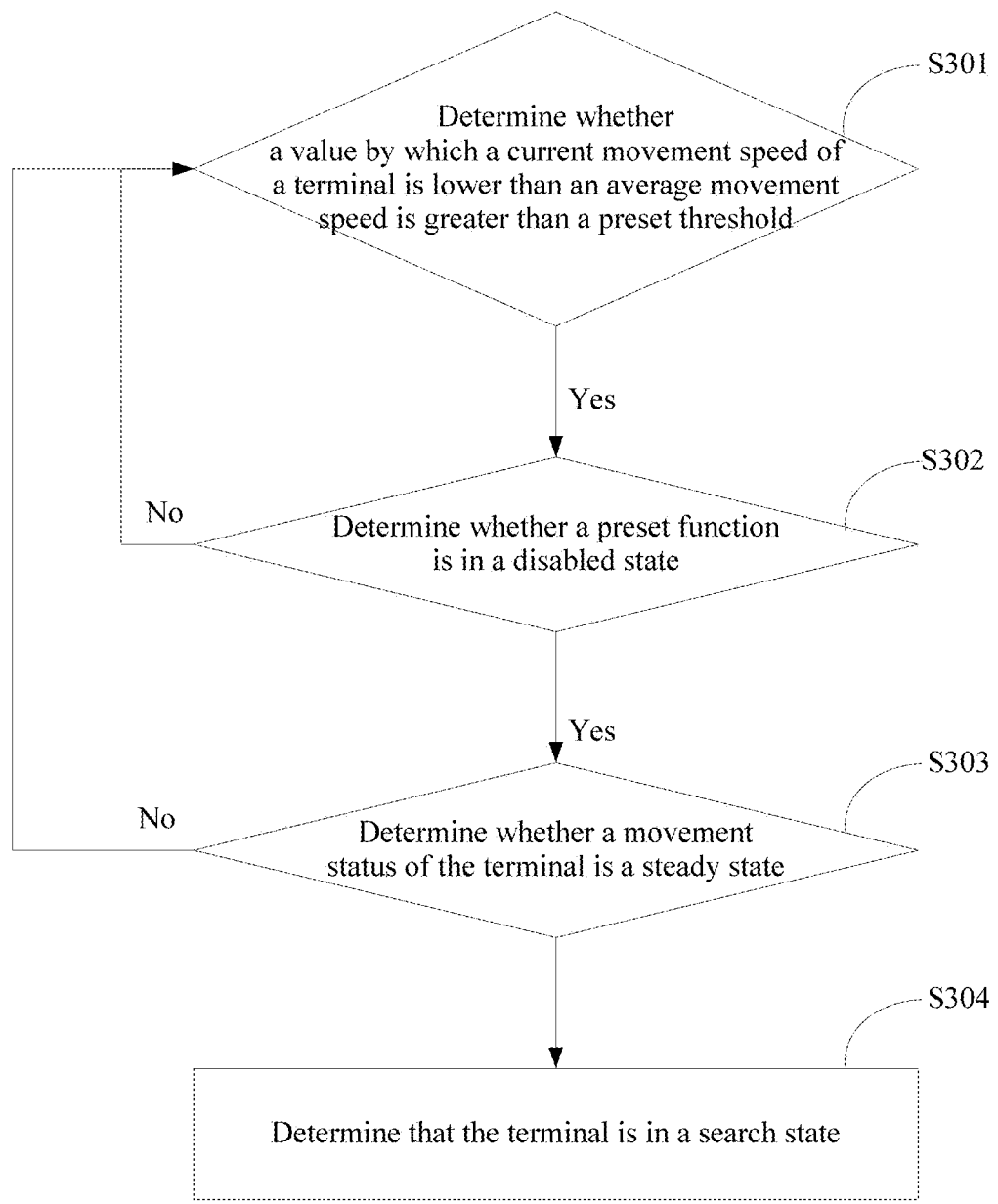
FIG. 3 is a flowchart of implementation of determining whether a terminal is in a searching state in a method for discovering an AR object according to an embodiment of the present invention.

FIG. 3 illustrates a flowchart of implementation of determining whether a terminal is in a searching state in a method for discovering an AR object according to an embodiment of the present invention. In the embodiment illustrated in FIG. 3, after it is determined that a movement speed of the terminal is obviously decreased, with reference to all preset conditions that all status parameters of the terminal need to meet, accuracy of determining a status of the terminal can be improved to a largest extent by using the embodiment illustrated in FIG. 3. Apparently, in an actual determining process, an execution sequence of steps S302 and S303 in the embodiment illustrated in FIG. 3 is not limited, and it may also be that only S302 or only S303 is executed, which is not limited one by one herein.

As shown in FIG. 3, in step S301, determine whether a difference value by which a current movement speed of the terminal is lower than an average movement speed is greater than a preset value. If the value is greater than the preset value, execute step S302. If the value is not greater than the preset value, determine that the terminal is not in the searching state.

In step S302, determine whether a preset function of the terminal is in a disabled state. If yes, execute step S303. Otherwise, determine that the terminal is not in the searching state.

In step S303, determine whether a movement status of the terminal is a steady state. If the movement status of the terminal is a steady state, execute step S304. If the movement status of the terminal is not in a steady state, determine that the terminal is not in the searching state.

Further, in step S303, after it is determined that the movement status of the terminal is a steady state, determine whether a time during which the movement status of the terminal is a steady state is greater than a preset time threshold. If the time during which the movement status of the terminal is a steady state is greater than the preset time threshold, execute step S304.

In step S304, determine that the terminal is in the searching state.

It should be noted that, in the embodiment illustrated in FIG. 3 in the present invention, because all the related steps after step S301 are implemented by a sensor or a related detection apparatus of the terminal, preferably, before it is determined in step S301 that the movement speed of the terminal obviously changes, the sensor or the related detection apparatus of the terminal may be in a disabled or standby state; and the sensor or the related detection apparatus of the terminal may be enabled again to perform detection after it is determined in step S301 that a movement speed of a user obviously changes, so as to reduce power consumption of a terminal device.

It should be noted that an execution body of the foregoing steps S301 to S304 is the terminal.

Figure 4:
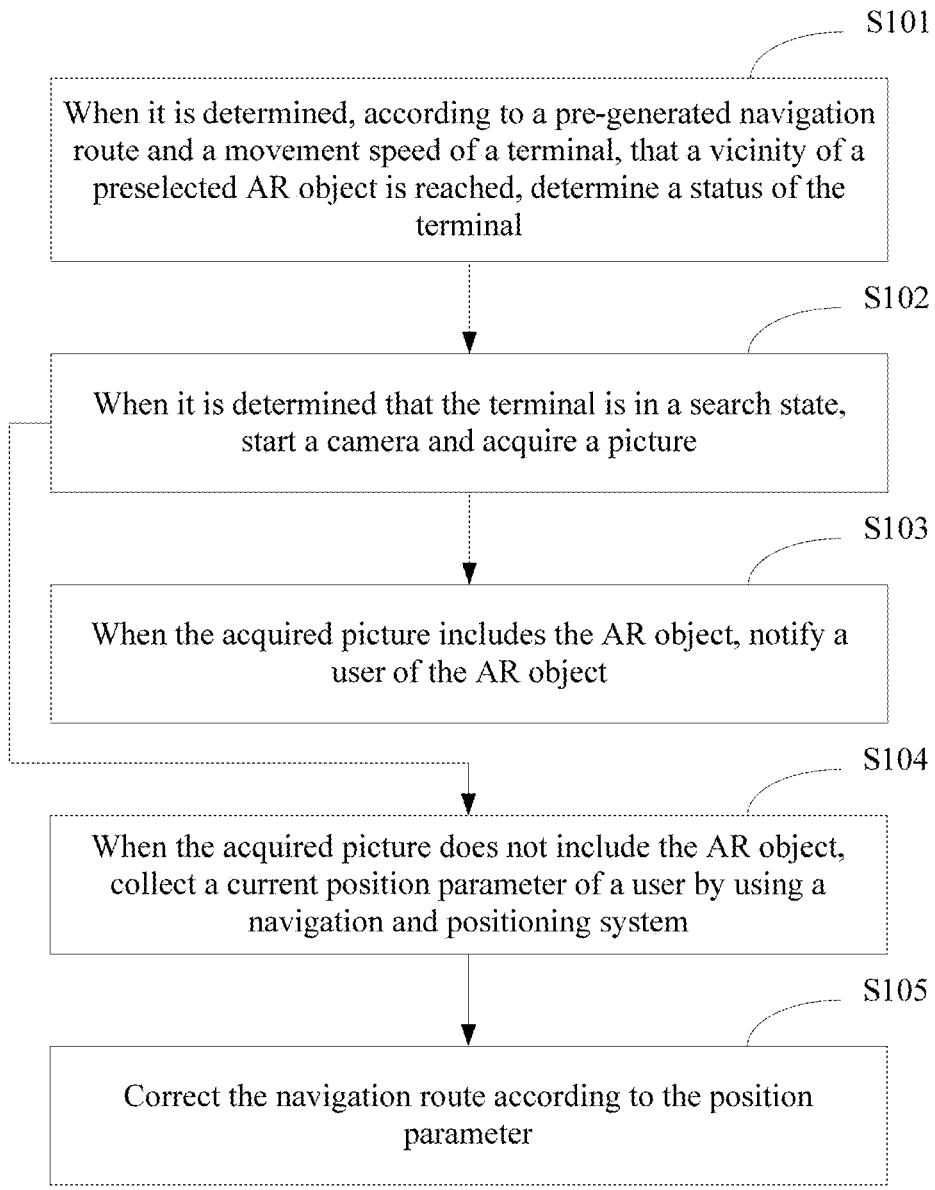
FIG. 4 is a flowchart of implementation of a method for discovering an AR object according to another embodiment of the present invention.

FIG. 4 shows a procedure of implementing a method for discovering an AR object according to another embodiment of the present invention. On a basis of the embodiment illustrated in FIG. 1 in the present invention, this embodiment describes a situation in which it is identified that one or more focused objects do not include the AR object. Details are described in the following.

In step S104, when the acquired picture does not include the AR object, collect a current position parameter of the terminal by using a navigation and positioning system.

In step S105, correct the navigation route according to the position parameter.

In this embodiment, when an extracted focused object does not include the AR object, it is considered whether the terminal is correctly guided to the vicinity of the AR object. In this case, the position parameter of the current position is collected to correct the navigation route. The position parameter includes but is not limited to parameter information such as a GPS parameter of the current position of the terminal and an obvious sign of the current position of the terminal, where the GPS parameter can be used to determine whether the current position is located in the vicinity of the AR object, and the obvious sign of the current position can be used to match with an obvious sign, in a system, of the vicinity of the AR object, so as to determine whether the current position is in the vicinity of the AR object, so that the navigation route is re-corrected in a case of a wrong position, thereby leading a user to move forward.

Figure 5:
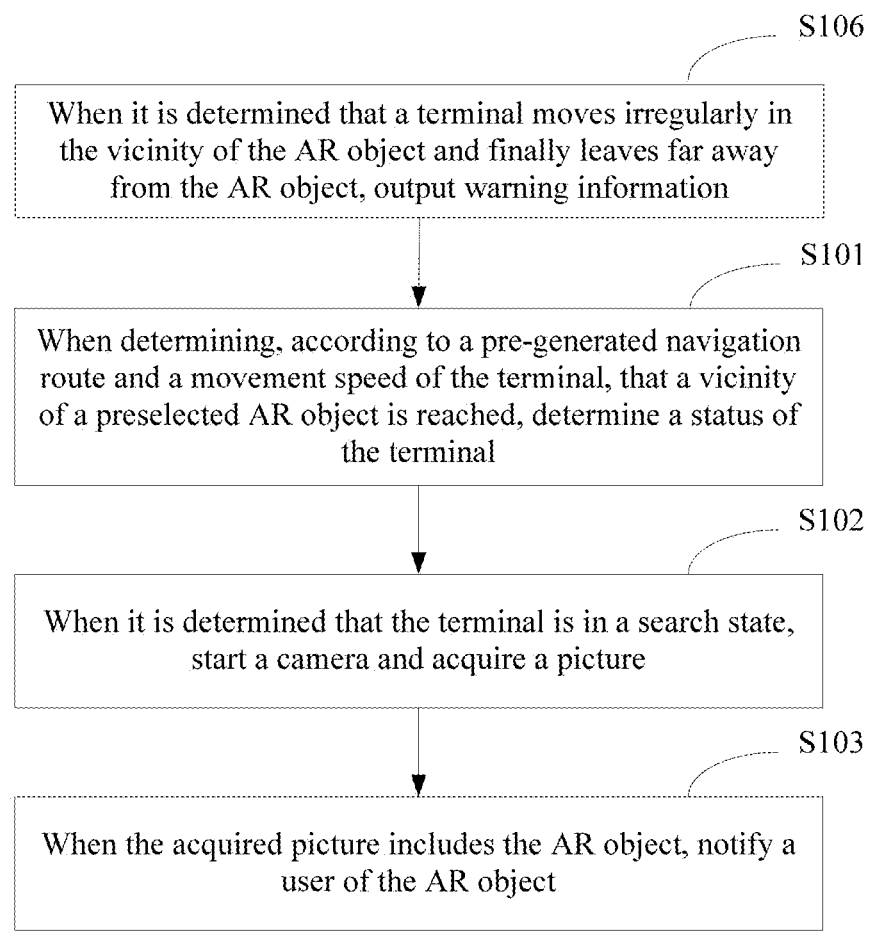
FIG. 5 is a flowchart of implementation of a method for discovering an AR object according to another embodiment of the present invention.

Considering a case in which a user is in a vicinity of an AR object but cannot confirm a specific position of the AR object, FIG. 5 shows a procedure of implementing a method for discovering an AR object according to another embodiment of the present invention. Before step S101, or after step S103, or after step S105, the method further includes the following step.

Step S106: When it is determined that the terminal moves irregularly in the vicinity of the AR object and finally goes far away from the AR object, output warning information.

The warning information includes at least one of the following: vibration, ringing, or light emitting, so that the user can learn the specific position of the AR object in a current environment, and is further led to discover the AR object.

Alternatively, in a case in which an AR task alarm is used to notify the user that the vicinity of the AR object is reached, the warning information may be output when the AR task alarm goes off, or before the AR task alarm goes off, or after the AR task alarm goes off, so as to alert the user to notice that the AR object is discovered.

In this embodiment of the present invention, when it is determined that a terminal is in a searching state, a picture of an ambient environment is automatically acquired, thereby extracting one or more objects from the picture to match with an AR object, and implementing automatic startup of an AR processing procedure in an environment without a marking object, to accurately discover a small AR object, which greatly reduces time for discovering an AR object.

Figure 6:
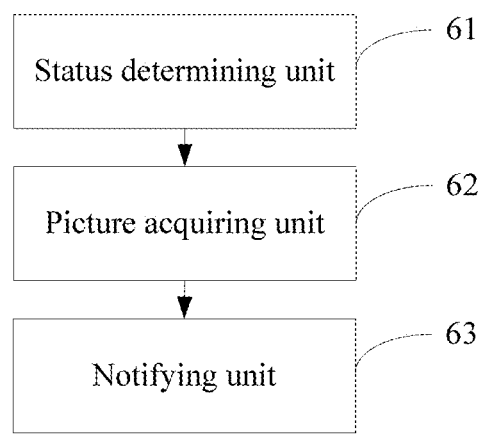
FIG. 6 is a structural block diagram of a terminal for discovering an AR object according to an embodiment of the present invention.

FIG. 6 shows a structural block diagram of a terminal for discovering an AR object according to an embodiment of the present invention. The terminal may be located in an AR terminal such as a smart mobile terminal or a head-mounted device, and is configured to run the methods described in the embodiments in FIG. 1 to FIG. 5 in the present invention. For ease of description, only a part related to this embodiment is illustrated.

Referring to FIG. 6, the terminal includes a status determining unit 61 configured to, when it is determined, according to a pre-generated navigation route and a movement speed of the terminal, that a vicinity of a preselected AR object is reached, determine a status of the terminal; a picture acquiring unit 62 configured to, when the status determining unit 61 determines that the terminal is in a searching state, start a camera and acquire a picture; and a notifying unit 63 configured to, when the picture acquired by the picture acquiring unit 62 includes the AR object, notify of the AR object.

Optionally, the status determining unit 61 includes a distance acquiring subunit configured to acquire a distance between a position of the AR object and a starting position of the terminal according to the pre-generated navigation route; a speed acquiring subunit configured to acquire, according to a movement manner preselected by the user, an average movement speed of the movement manner; an expected time acquiring subunit configured to calculate, according to the distance acquired by the distance acquiring subunit and the average movement speed acquired by the speed acquiring subunit, an expected time for the terminal to reach the vicinity of the AR object; and a determining subunit configured to, after the terminal starts from the starting position of the terminal and has moved the expected time, determine that the vicinity of the AR object is reached.

Optionally, the status determining unit 61 is configured to, when it is determined, according to the pre-generated navigation route and the movement speed of the terminal, that the vicinity of the preselected AR object is reached, determine, according to whether a gyroscope and a preset function are used, whether the terminal is in the searching state.

Optionally, the terminal further includes a parameter collecting unit configured to collect, when the picture acquired by the picture acquiring unit 62 does not include the AR object, a current position parameter of the terminal by using a navigation and positioning system; and a correcting unit configured to correct the navigation route according to the position parameter collected by the parameter collecting unit.

Optionally, the position parameter includes at least one of positioning parameter information of a current position of the terminal and an obvious sign of the current position of the terminal.

Optionally, the terminal further includes a warning unit configured to, when it is determined that the terminal moves irregularly in the vicinity of the AR object and finally goes far away from the AR object, output warning information.

Further, the warning information includes at least one of the following: vibration, ringing, or light emitting.

Figure 7:
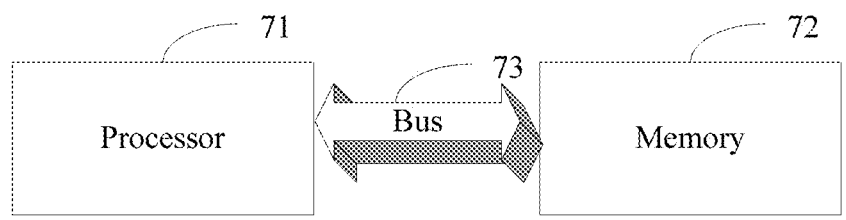
FIG. 7 is a structural block diagram of hardware of a terminal for discovering an AR object according to an embodiment of the present invention.

FIG. 7 shows a structural block diagram of hardware of a terminal for discovering an AR object according an embodiment of the present invention. The terminal may be a terminal such as a smart mobile terminal or a head-mounted device, and is configured to run the methods described in the embodiments in FIG. 1 to FIG. 5 in the present invention. For ease of description, only a part related to this embodiment is illustrated.

Referring to FIG. 7, the terminal includes a processor 71, a memory 72, and a bus 73. The processor 71 and the memory 72 communicate with each other by using the bus 73; the memory 72 is configured to store a program; and the processor 71 is configured to execute the program stored in the memory 72. When being executed, the program is used to, when it is determined, according to a pre-generated navigation route and a movement speed of a terminal, that a vicinity of a preselected AR object is reached, determine a status of the terminal; when it is determined that the terminal is in a searching state, start a camera and acquire a picture; and when the acquired picture includes the AR object, notify of the AR object.

Optionally, the determining a status of the terminal includes determining, according to whether a gyroscope and a preset function are used, whether the terminal is in the searching state.

Optionally, that it is determined, according to a pre-generated navigation route and a movement speed of the terminal, that a vicinity of a preselected AR object is reached includes acquiring a distance between a position of the AR object and a starting position of the terminal according to the pre-generated navigation route; acquiring, according to a movement manner preselected by the user, an average movement speed of the movement manner; calculating, according to the distance and the average movement speed, an expected time for the terminal to reach the vicinity of the AR object; and after the terminal starts from the starting position of the terminal, and has moved the expected time, determining that the vicinity of the AR object is reached.

Optionally, when being executed, the program is further used to, when the acquired picture does not include the AR object, collect a current position parameter of the terminal by using a navigation and positioning system; and correct the navigation route according to the position parameter.

Optionally, the position parameter includes at least one of positioning parameter information of a current position of the terminal and an obvious sign of the current position of the terminal.

Optionally, when being executed, the program is further used to, when it is determined that the terminal moves irregularly in the vicinity of the AR object and finally goes far away from the AR object, output warning information.

Optionally, the warning information includes at least one of the following: vibration, ringing, or light emitting.

Figure 8:
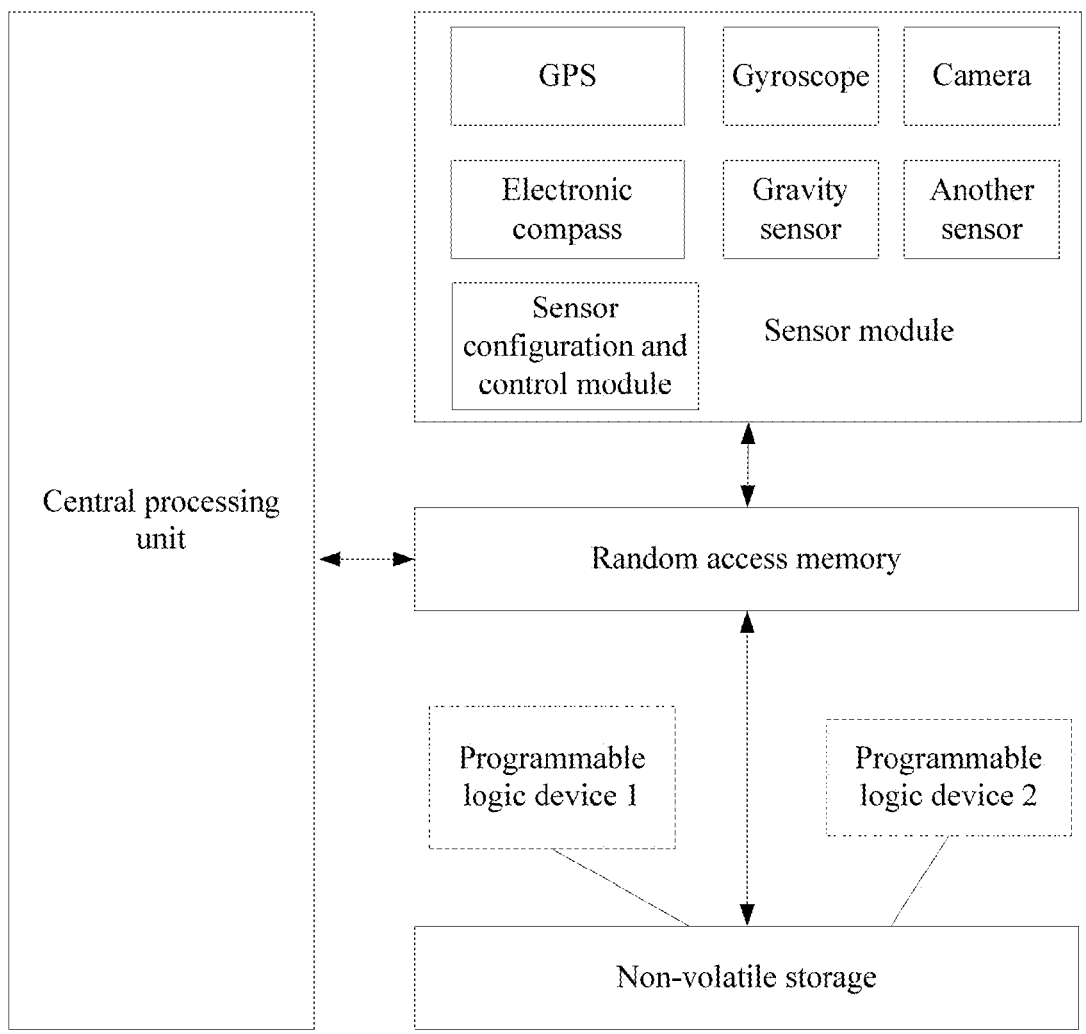
FIG. 8 is a block diagram of implementation of hardware of a terminal for discovering an AR object according to an embodiment of the present invention.

Based on the embodiment illustrated in FIG. 6 in the present invention, FIG. 8 provides a block diagram of implementation of hardware of a system for discovering an AR object according to an embodiment of the present invention. As shown in FIG. 8, related functions of the apparatus described in the embodiment of FIG. 6 in the present invention may be implemented by using related hardware functional modules separately deployed in FIG. 8, which is not described herein again.

In this embodiment of the present invention, when it is determined that a terminal is in a searching state, a picture of an ambient environment is automatically acquired, thereby extracting one or more objects from the picture to match with an AR object, and implementing automatic startup of an AR processing procedure in an environment without a marking object, to accurately discover a small AR object, which greatly reduces time for discovering an AR object.

The foregoing descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A method for discovering an augmented reality (AR) object, comprising:
   determining a status of a terminal when it is determined, according to a pre-generated navigation route and a movement speed of the terminal, that a vicinity of a preselected AR object is reached;
   starting a camera and acquiring a picture when it is determined that the terminal is in a searching state;
   extracting N focused objects from the picture using an image recognition algorithm, wherein N is an integer greater than or equal to one;
   processing M of the N focused objects using a high-speed and low-precision algorithm, wherein M is an integer greater than or equal to one and less than or equal to N;
   processing N-M of the N focused objects using a precise recognition algorithm;
   determining whether the M and the N-M of the N focused objects in the picture include the AR object; and
   notifying of the AR object when the picture comprises the AR object.

2. The method according to claim 1, wherein that it is determined, according to the pre-generated navigation route and the movement speed of the terminal, that the vicinity of the preselected AR object is reached comprises:
   acquiring a distance between a position of the AR object and a starting position of the terminal according to the pre-generated navigation route;
   acquiring, according to a movement manner preselected by the user, an average movement speed of the movement manner, wherein the movement manner selected from walking, bicycling, and driving;
   calculating, according to the distance and the average movement speed, an expected time for the terminal to reach the vicinity of the AR object; and
   determining that the vicinity of the AR object is reached after the terminal starts from the starting position of the terminal and has moved the expected time.

3. The method according to claim 1, wherein the method further comprises:
   collecting a current position parameter of the terminal by using a navigation and positioning system when the picture does not comprise the AR object; and
   correcting the navigation route according to the position parameter.

4. The method according to claim 3, wherein the position parameter comprises at least one of positioning parameter information of a current position of the terminal and an obvious sign of the current position of the terminal.

5. The method according to claim 1, wherein determining the status of the terminal comprises determining, according to whether a gyroscope and preset functions are used, whether the terminal is in the searching state, wherein the preset functions comprise a voice call, a short message service message, a multimedia messaging service, an alarm, and a calendar event.

6. The method according to claim 1, further comprising outputting warning information when it is determined that the terminal moves irregularly in the vicinity of the AR object and finally goes far away from the AR object, wherein the warning information comprises vibration, ringing, and light emitting.

7. A terminal, comprising:
a computer processor configured to:
determine a status of the terminal when it is determined, according to a pre-generated navigation route and a movement speed of the terminal, that a vicinity of a preselected augmented reality (AR) object is reached;
start a camera and acquire a picture when determined that the terminal is in a searching state;
extract N focused objects from the picture using an image recognition algorithm, wherein N is an integer greater than or equal to one;
process M of the N focused objects using a high-speed and low-precision algorithm, wherein M is an integer greater than or equal to one and less than or equal to N;
process N-M of the N focused objects using a precise recognition algorithm;
determine whether the M and the N-M of the N focused objects in the picture include the AR object; and
notify of the AR object when the picture comprises the AR object.

8. The terminal according to claim 7, wherein the computer processor is configured to:
acquire a distance between a position of the AR object and a starting position of the terminal according to the pre-generated navigation route;
acquire, according to a movement manner preselected by the user, an average movement speed of the movement manner, wherein the movement manner is selected from walking, bicycling, and driving;
calculate, according to the distance and the average movement speed, an expected time for the terminal to reach the vicinity of the AR object; and
determine that the vicinity of the AR object is reached after the terminal starts from the starting position of the terminal and has moved the expected time.

9. The terminal according to claim 7, wherein the computer processor is configured to:
collect a current position parameter of the terminal by using a navigation and positioning system when the picture does not comprise the AR object; and
correct the navigation route according to the position parameter.

10. The terminal according to claim 9, wherein the position parameter comprises at least one of positioning parameter information of a current position of the terminal and an obvious sign of the current position of the terminal.

11. The terminal according to claim 7, wherein the computer processor is configured to determine, according to whether a gyroscope and preset functions are used, whether the terminal is in the searching state when it is determined, according to the pre-generated navigation route and the movement speed of the terminal, that the vicinity of the preselected AR object is reached, wherein the preset functions comprise a voice call, a short message service message, a multimedia messaging service, an alarm, and a calendar event.

12. The terminal according to claim 7, wherein the computer processor is configured to output warning information when it is determined that the terminal moves irregularly in the vicinity of the AR object and finally goes far away from the AR object, wherein the warning information comprises vibration, ringing, and light emitting.

13. The method according to claim 1, further comprising:
determining a difference value by which a current movement speed of the terminal is lower than an average movement speed of the terminal; and
determining that the terminal is in a searching state when the difference value is greater than a preset threshold.

14. The method according to claim 1, further comprising:
determining that the terminal is in a focusing state when a change in an angle of view of a user during a particular time is less than a threshold value; and
processing the picture after determining that the terminal is in the focusing state.

15. The terminal according to claim 7, wherein the computer processor is configured to:
determine a difference value by which a current movement speed of the terminal is lower than an average movement speed of the terminal; and
determine that the terminal is in a searching state when the difference value is greater than a preset threshold.

16. The terminal according to claim 7, wherein the computer processor is configured to:
determine that the terminal is in a focusing state when a change in an angle of view of a user during a particular time is less than a threshold value; and
process the picture after determining that the terminal is in the focusing state.

17. A non-transitory computer-readable medium having instructions stored thereon, that when executed by a computer processor, cause the computer processor to perform a method comprising:
determining a status of a terminal when it is determined, according to a pre-generated navigation route and a movement speed of the terminal, that a vicinity of a preselected AR object is reached;
starting a camera and acquiring a picture when it is determined that the terminal is in a searching state;
extracting N focused objects from the picture using an image recognition algorithm, wherein N is an integer greater than or equal to one;
processing M of the N focused objects using a high-speed and low-precision algorithm, wherein M is an integer greater than or equal to one and less than or equal to N;
processing N-M of the N focused objects using a precise recognition algorithm;
determining whether the M and the N-M of the N focused objects in the picture include the AR object; and
notifying of the AR object when the picture comprises the AR object.

* * * * *

UNITED STATES PATENT AND TRADEMARK OFFICE
CERTIFICATE OF CORRECTION

PATENT NO.       : 9,436,874 B2
APPLICATION NO.  : 14/573178
DATED            : September 6, 2016
INVENTOR(S)      : Li et al.

Page 1 of 1

It is certified that error appears in the above-identified patent and that said Letters Patent is hereby corrected as shown below:

In The Claims

Column 12; Line 39; Claim 2 should read:

The method according to claim 1, wherein that it is determined, according to the pre-generated navigation route and the movement speed of the terminal, that the vicinity of the preselected AR object is reached comprises:
    acquiring a distance between a position of the AR object and a starting position of the terminal according to the pre-generated navigation route;
    acquiring, according to a movement manner preselected by the user, an average movement speed of the movement manner, wherein the movement manner is selected from walking, bicycling, and driving;
    calculating, according to the distance and the average movement speed, an expected time for the terminal to reach the vicinity of the AR object; and
    determining that the vicinity of the AR object is reached after the terminal starts from the starting position of the terminal and has moved the expected time.

Signed and Sealed this
Twenty-ninth Day of November, 2016

Michelle K. Lee
*Director of the United States Patent and Trademark Office*